(12) United States Patent
Davis et al.

(10) Patent No.: US 6,489,056 B1
(45) Date of Patent: Dec. 3, 2002

(54) BATTERY INCLUDING A HYDROGEN-ABSORBING CATHODE MATERIAL

(75) Inventors: Stuart M. Davis, Norfolk, MA (US); Enoch Wang, Mansfield, MA (US)

(73) Assignee: The Gillette Company, Boston, MA (US)

( * ) Notice: Subject to any disclaimer, the term of this patent is extended or adjusted under 35 U.S.C. 154(b) by 158 days.

(21) Appl. No.: 09/664,068

(22) Filed: Sep. 18, 2000

(51) Int. Cl.$^7$ ................................................ H01M 4/58
(52) U.S. Cl. .................... 429/218.2; 429/206; 429/229; 429/223; 429/219; 429/220; 29/623.1
(58) Field of Search .............................. 429/206, 218.2, 429/229, 223, 219, 220, 232; 29/623.1

(56) References Cited

U.S. PATENT DOCUMENTS

| | | | |
|---|---|---|---|
| 3,899,350 A | 8/1975 | Jackovitz et al. | 136/29 |
| 3,911,094 A | 10/1975 | Megahed et al. | 423/592 |
| 4,054,727 A | * 10/1977 | O'Nan et al. | 429/86 |
| 4,074,030 A | 2/1978 | Ruben | 429/223 |
| 4,224,392 A | 9/1980 | Oswin | 429/206 |
| 4,605,604 A | 8/1986 | Pollack et al. | 429/116 |
| 4,613,552 A | * 9/1986 | Ruben | 429/224 |
| 4,663,256 A | 5/1987 | Corrigan | 429/223 |
| 4,844,948 A | 7/1989 | Nakahori et al. | 49/126.3 |
| 4,939,048 A | * 7/1990 | Vignaud | 429/161 |
| 5,336,276 A | 8/1994 | Pensabene et al. | 29/623 |
| 5,348,822 A | 9/1994 | Ovshinsky et al. | 429/223 |
| 5,453,336 A | 9/1995 | Adler et al. | 429/207 |
| 5,494,763 A | 2/1996 | Behl et al. | 429/206 |
| 5,508,121 A | 4/1996 | Sawa | 429/59 |
| 5,514,497 A | 5/1996 | Furukawa | 429/223 |
| 5,567,549 A | 10/1996 | Ovshinksy et al. | 429/223 |
| 5,569,559 A | * 10/1996 | Fauvarque | 429/192 |
| 5,569,562 A | 10/1996 | Glemser et al. | 429/223 |
| 5,620,813 A | 4/1997 | Lee et al. | 429/223 |
| 5,691,086 A | 11/1997 | Baba et al. | 429/218 |
| 5,744,259 A | 4/1998 | Ohta et al. | 429/59 |
| 5,744,266 A | 4/1998 | Nunome et al. | 429/224 |
| 5,759,718 A | 6/1998 | Yao et al. | 429/223 |
| 5,928,714 A | 7/1999 | Nunome et al. | 427/126.3 |
| 5,958,621 A | 9/1999 | Kao | 429/217 |
| 6,007,946 A | 12/1999 | Yano et al. | 429/223 |
| 6,013,390 A | 1/2000 | Kimiya et al. | 429/206 |
| 6,020,088 A | 2/2000 | Singh | 429/223 |
| 6,083,642 A | 7/2000 | Kato et al. | 429/218.1 |
| 6,300,011 B1 | * 10/2001 | Lin et al. | 429/229 |

FOREIGN PATENT DOCUMENTS

| | | | |
|---|---|---|---|
| GB | 1124299 | 8/1968 | |
| JP | 48-2384 | 1/1973 | 43/4 |
| JP | 56-145668 | 11/1981 | 4/24 |
| JP | 60143569 A | 6/1985 | 4/62 |
| JP | 61-158667 | 6/1986 | 4/62 |
| JP | 6318751 A | 8/1988 | 4/62 |
| JP | 01059766 A | 3/1989 | 4/32 |
| JP | 03055758 A | 3/1991 | 4/32 |
| JP | 0436653 A | 12/1992 | 4/52 |
| RU | 339995 | 6/1972 | 43/2 |
| WO | 00/21151 | 4/2000 | 4/48 |

OTHER PUBLICATIONS

Compton, TR, Battery Reference Book, 1997, Reed Educational and Professional Publishing Ltd., 2nd Ed., Sect. 21.1–21.2.*

"Sealed Nickel–Zinc Cells Using Stable Nicklec Oxyhydroxide Depolarizer," S. A. Meghed et al., Proceedings of the Symposium on Battery Design and Optimization, *The Electrochemical Society, Inc.*, S. Gross, Ed., 79–1:259–282 (1979).

"Cobalt oxyhydroxides obtained by 'chime douce' reactions: structure and electronic conductivity properties," M. Butel et al., *Solid State Ionics*, 122:271–284 (1999).

"Oxidation mechanism of cobalt hydroxide to cobalt oxyhydroxide," V. Pralong et al., *J. Mater. Chem.* 9:955–960 (1999).

* cited by examiner

*Primary Examiner*—Patrick Ryan
*Assistant Examiner*—Angela J. Martin
(74) *Attorney, Agent, or Firm*—Fish & Richardson P.C.

(57) ABSTRACT

An alkaline battery has a cathode including a hydrogen absorbing material and an anode including zinc free of lead, mercury, or cadmium.

24 Claims, 1 Drawing Sheet

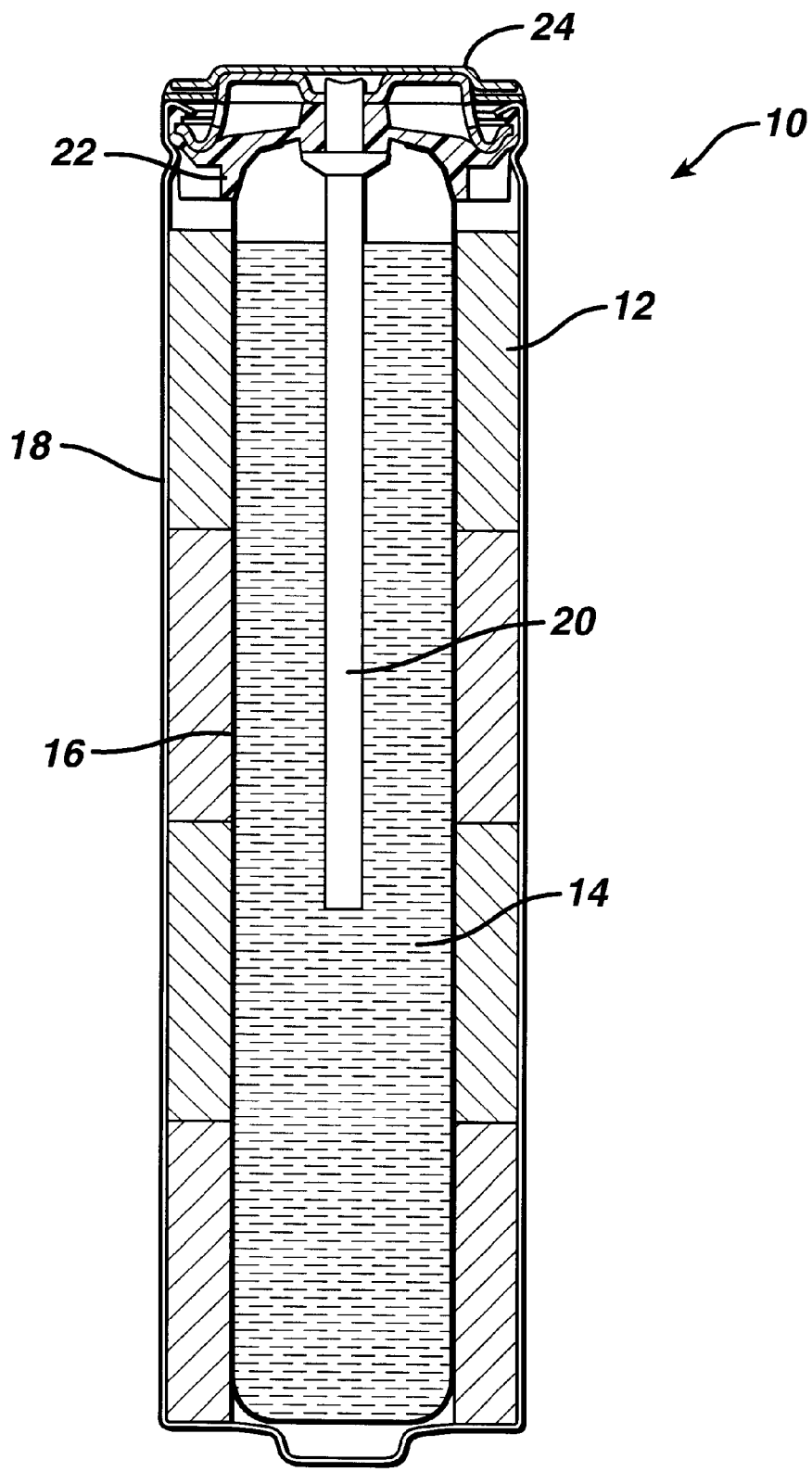

BATTERY INCLUDING A HYDROGEN-ABSORBING CATHODE MATERIAL

TECHNICAL FIELD

This invention relates to batteries.

BACKGROUND

Batteries, such as primary alkaline batteries, are commonly used as energy sources. Generally, alkaline batteries include a cathode, an anode, a separator, and an electrolytic solution. The cathode can include an active material, such as manganese dioxide or nickel oxide, carbon particles that enhance the conductivity of the cathode, and a binder. The anode may be, for example, a gel including zinc particles as the active material. The separator is disposed between the cathode and the anode. The electrolytic solution can be, for example, a hydroxide solution that is dispersed throughout the battery.

Desirable primary alkaline batteries have a zinc anode that generates little hydrogen. Typically, primary batteries use amalgamated zinc anodes. Mercury added to the zinc helps decrease the amount of hydrogen generated from, for example, water in contact with the zinc. Hydrogen generation in the anode can cause pressure to build up in the battery which can lead to leaks.

SUMMARY

The invention features a primary alkaline battery including a zinc anode free of lead, mercury, or cadmium. The cathode is a hydrogen-absorbing cathode material. The hydrogen-absorbing cathode material presently absorbs hydrogen at a faster rate than electrochemically-produced manganese dioxide. For example, the hydrogen-absorbing cathode material absorbs at least 20% more hydrogen than an equivalent amount of electrochemically-produced manganese dioxide within an equivalent time interval.

By eliminating added lead, mercury, or cadmium from the anode, a safer, more environmentally friendly battery can be produced. The zinc free of lead, mercury, or cadmium is free of added lead, mercury, or cadmium. The zinc contains less than 100 ppm, preferable less than 25 ppm, and more preferably less than 5 ppm of lead, mercury or cadmium. Elimination of a substantial weight and volume of mercury in particular allows a higher gravimetric and volumetric energy density to be achieved. Primary batteries containing electrochemically-produced manganese dioxide (EMD) cathodes and zinc anodes free of lead, mercury, or cadmium suffer from increased zinc gassing compared to batteries that contain mercury, lead or cadmium in the anode. The increased gassing cans cause the battery to leak or rupture. By replacing the EMD cathode with another cathode material having higher hydrogen absorption rate than EMD, the cathode can absorb the hydrogen and reduce the incidence of leakage and rupture. The hydrogen-absorbing cathode material can reduce pressure build-up within the battery that can be produced by zinc free of lead, mercury, or cadmium.

In one aspect a primary alkaline battery including a cathode, an anode, a separator, and an alkaline electrolyte. The cathode includes a hydrogen-absorbing cathode material. The anode includes zinc free of lead, mercury, or cadmium.

In another aspect, the invention features a method of manufacturing a primary alkaline battery. The method includes assembling a cathode, an anode, a separator, and an alkaline electrolyte to form the alkaline battery. The cathode includes a hydrogen-absorbing cathode material and the anode includes zinc free of lead, mercury, or cadmium.

In another aspect, the invention features a primary alkaline battery including a cathode including an active material that absorbs hydrogen more rapidly than an equivalent amount of electrochemically-produced manganese dioxide within an equivalent time interval, an anode including zinc free of lead, mercury, or cadmium, and an alkaline electrolyte.

The hydrogen-absorbing cathode material can include a nickel oxyhydroxide, a copper oxide, a chemically-produced manganese oxide, a silver oxide, a barium permanganate or a silver permanganate. The method also includes forming an anode including a zinc free of lead, mercury, or cadmium.

Other features and advantages of the invention will be apparent from the description and drawings, and from the claims.

DETAILED DESCRIPTION

Referring to the FIG. 1, battery 10 includes a cathode 12, an anode 14, a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D battery.

Cathode 12 includes a hydrogen-absorbing cathode material, carbon particles, and a binder. The hydrogen-absorbing cathode material absorbs hydrogen at a rate faster than an equivalent amount of electrochemically-produced manganese dioxide within an equivalent time interval. The hydrogen-absorbing cathode material absorbs at least 20% more, preferably at least 30% more, and more preferably 40% more hydrogen than an equivalent amount of electrochemically-produced manganese dioxide within an equivalent time interval. The hydrogen-absorbing cathode material can absorb hydrogen at a rate of 1.2 to 100, preferably 1.3 to 90, and more preferably 1.4 to 88 times the rate of hydrogen absorption of electrochemically-produced manganese dioxide at the same temperature. The electrochemically-produced manganese dioxide can be produced by the method described, for example, in U.S. Pat. No. 5,698,176, or obtained commercially from, for example, Delta E.M.D. (Pty) Ltd. (Nelspruit, South Africa), or Kerr-McGee Chemical Co. (Oklahoma City, Okla.).

The cathode material can be a nickel oxyhydroxide, a silver oxide, a copper oxide, a chemically-produced manganese dioxide, a barium permanganate, or a silver permanganate. Nickel oxyhydroxide can be formed by oxidation of $Ni(OH)_2$ as described, for example, in U.S. Pat. No. 3,911,094. Copper oxide can be produced by thermal decomposition of $CuCO_3$ or $Cu(NO_3)_2$. Chemically-produced manganese dioxide (CMD) can be produced by oxidation of $Mn^{2+}$ using $ClO_3^-$ or $S_2O_8^{2-}$ either in the presence or absence of a substrate. Silver oxide can be prepared by treating $AgNO_3$ with sodium hydroxide and then gently heating the insoluble precipitate. Barium permanganate can be prepared chemically by treating barium chloride with silver permanganate or electrochemically as described in Zadikashvili et al., Elektrokhim. Margastsa, 3:212 (1967). Silver permanganate can be prepared by treating potassium permanganate with silver nitrate.

Distributors of the cathode materials or starting materials for making the cathode material include H C Starck, J M C Tanaka Chemical Corp. (Fukui, Japan), Johnson-Matthey, Aldrich, Alfa Aesar, or Carus Chemical. Generally the cathode may include, for example, between 80% and 90%, and preferably between 86% and 88%, of cathode material by weight.

The carbon particles can be graphite particles. The graphite can be synthetic or non-synthetic, or a blend of synthetic and non-synthetic. Suitable graphite particles can be obtained from, for example, Brazilian Nacional de Grafite (Itapecerica, MG Brazil (MP-0702X)) or Chuetsu Graphite Works, Ltd. (Chuetsu grades WH-20A and WH-20AF) of Japan. The cathode may include for example, between 3% and 7%, preferably between 4% and 6.5% carbon particles by weight.

Examples of binders include polyethylene powders, polyacrylamides, Portland cement and fluorocarbon resins, such as PVDF and PTFE. An example of polyethylene binder is sold under the trade name Coathylene HA-1681 (available from Hoechst). The cathode may include, for example, between 0.1 percent to about 1 percent of binder by weight.

Cathode 12 can include other additives. Examples of these additives are disclosed, for example, in U.S. Pat. No. 5,342,712, which is hereby incorporated by reference. Cathode 12 may include, for example, from about 0.2 weight percent to about 2 weight percent $TiO_2$.

The electrolyte solution also is dispersed through cathode 12, and the weight percentages provided above and below are determined after the electrolyte solution has been dispersed.

Anode 14 can be formed of zinc materials that are free of lead, mercury, or cadmium. Preferably, the zinc is free of lead, mercury and cadmium. For example, anode 14 can be a zinc slurry that includes zinc metal particles, a gelling agent, and minor amounts of additives, such as gassing inhibitor. In addition, a portion of the electrolyte solution is dispersed throughout the anode.

The zinc particles can be any of the zinc particles conventionally used in slurry anodes. Examples of zinc particles include those described in U.S. Ser. Nos. 08/905,254, 09/115,867, and 09/156,915, which are assigned to the assignee in the present application and are hereby incorporated by reference. The anode may include, for example, between 67% and 71% of zinc particles by weight.

The anode can include an inorganic gassing inhibitor such as bismuth or indium. The zinc particles can be a zinc alloy containing 25 ppm to 1000 ppm indium or 25 ppm to 1000 ppm bismuth. For example, the zinc can contain 150 ppm indium and 200 ppm bismuth.

The electrolyte can be an aqueous solution of KOH or NaOH. The electrolyte can contain 20%–50% by weight alkali hydroxide dissolved in $H_2O$. The electrolyte can contain 0% to 4% by weight zinc oxide.

Examples of gelling agents include polyacrylic acids, grafted starch materials, salts of polyacrylic acids, polyacrylates, carboxymethylcellulose, sodium carboxymethylcellulose or combinations thereof. Examples of such polyacrylic acids are Carbopol 940 and 934 (available from B. F. Goodrich) and Polygel 4P (available from 3V), and an example of a grafted starch material is Waterlock A221 or A220 (available from Grain Processing Corporation, Muscatine, Iowa). An example of a salt of a polyacrylic acid is Alcosorb G1 (available from Ciba Specialties). The anode may include, for example, from 0.1 percent to about 2 percent gelling agent by weight.

Gassing inhibitors can be inorganic materials, such as bismuth, tin, and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of non-woven, non-membrane material with one layer being disposed along a surface of the other. To minimize the volume of separator 16 while providing an efficient battery, each layer of non-woven, non-membrane material an have a basic weight of about 54 grams per square meter, a thickness of about 5.4 mils when dry and a thickness of about 10 mils when wet. In these embodiments, the separator preferably does not include a layer of membrane material or a layer of adhesive between the non-woven, non-membrane layers. Generally, the layers can be substantially devoid of fillers, such as inorganic particles.

In other embodiments, separator 16 includes a layer of cellophane combined with a layer of non-woven material. The separator also includes an additional layer of non-woven material. The cellophane layer can be adjacent to cathode 12 or the anode. Preferably, the non-woven material contains from about 78 weight percent to about 82 weight percent PVA and from about 18 weight percent to about 22 weight percent rayon with a trace of surfactant. Such non-woven materials are available from PDM under the trade name PA25.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the circumference of cathode 12 or both. This conductive layer can be formed, for example, of a carbonaceous material. Such materials include LB1000 (Timcal), Eccocoat 257 (W. R. Grace & Co.), Electrodag 109 (Acheson Colloids Company), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

Hydrogen absorption tests were conducted on EMD as a control and seven other cathode materials including chemically-produced manganese dioxide, copper (II) oxide, silver (I) oxide, silver (II) oxide, nickel oxyhydroxide, barium permanganate, and silver permanganate. For each material, 10.56 milli-equivalents of cathode material sufficient to absorb 118 standard cubic centimeters (scc; measured under standard conditions of 0° C. and 1 atmosphere pressure) of hydrogen were loaded into a small (e.g. 1–2 cc) glass vial which was loosely plugged with polyester wool. The small glass vial was loaded into foil test bag The foil test bag is a plastic/aluminum foil/plastic laminate, as used in food packaging, which is closed by broad heat seals on three sides (e.g. ⅜ inch seal width) and is open on the fourth side. The inner plastic layer is sealable by an impulse type heat sealer, e.g. polyethylene or polypropylene.

A flattened metal tube was introduced into the open end of the bag and secured with several strips of masking tape to form a nearly airtight seal. The tube was attached through an automatic sealing coupling (Swagelock SS-QC4-D-400 and SS-QC4-B-400) to a $H_2$ charging apparatus. The charging apparatus included a closed system containing a hydrogen tank with a regulator set to one atmosphere a pressure gauge to monitor the system pressure, a ball valve connected to a vacuum pump, a 25 mL volume container, and a quick connect fitting that connects to the automatic sealing coupling. The coupling contains an automatic valve which closes upon being disconnected, preventing the $H_2$ in the bag from escaping and preventing the atmosphere from entering. Most of the air was withdrawn from the bag by applying vacuum to the tube (~28 inches negative pressure). From a calibrated volume, 150 to 200 cc of $H_2$ gas (measured at ambient conditions) was charged into the bag. The bag expanded to accept the gas. The gas was immediately evacuated, and $H_2$ gas was again charged into the bag. A total of two flushing operations were executed on the bag. The bag was then charged a final time with 150–200 cm$^3$ of $H_2$. The automatic sealing coupling was disconnected from the charging apparatus.

The bag was immediately sealed on an electric impulse sealer, in the region close to the taped opening, with three parallel seals, thereby hermetically closing the previously open end of the bag. Scissors were used to cut the section of the bag between the outermost seal and the masking tape, freeing the metal filling tube. Several small holes were punched in the periphery of the bag in the flat seal area at two opposite edges. Care was taken not to approach too closely to the central, filled portion of the bag.

The bag was weighed dry. An analytical balance was tared at zero while a brass ballast weight of approximately 200 grams suspended from the balance was fully immersed in the water. The bag, along with a ballast weight attached to one of the small holes at the lower edge of the bag, was suspended from the analytical balance and both the bag and the weight were fully immersed in water. The buoyant weight was recorded. The water temperature and ambient pressure were recorded. Using the dry weight, buoyant weight, temperature and pressure, the initial volume of gas in the bag was calculated. The volume, in standard cubic centimeters (scc; 0° C., 760 mm Hg pressure), was calculated as follows:

Volume (scc)=(buoyant weight (g)+dry weight (g))×273.16° K/T(°K)×P(mm Hg)/760 mm Hg Each bag was stored at 55° C., with the exception of the bag containing $AgMnO_4$ which was stored at room temperature. Absorption measurements were carried out by allowing each bag to cool to ambient temperature for about 1–2 hours prior to weighing by immersing in water to determine buoyancy as described above. The buoyant weight, water temperature and ambient pressure were recorded and gas law corrections were made to determine the quantity of hydrogen gas absorbed after a given storage period. Any increase in the apparent weight of the bag signifies a decrease in buoyancy, hence a reduction in volume due to $H_2$ absorption. In general, the $H_2$ absorption was taken to be 1 cc of $H_2$ (at ambient conditions) for each 1 gram change in weight. This was converted using the ideal gas laws to scc of $H_2$, i.e., at 0° C. and one atmosphere pressure.

The quantities of absorbed $H_2$ for each of the materials, after 16 days and after 35 days, are summarized in Table I.

TABLE I

| Material | Hydrogen Absorbed (scc) After 16 days at 55° C. | Hydrogen Absorbed (scc) After 35 days at 55° C. |
|---|---|---|
| EMD (Kerr-McGee) | 0.23 | 0.35 |
| CMD (Erachem Far 2000) | 0.67 | 1.33 |
| CuO (Johnson-Matthey) | 0.50 | 0.74 |
| $Ag_2O$ (Aldrich) | 20.39 | 20.51 |
| AgO (Alfa Aesar) | 18.85 | 19.16 |
| NiOOH (Duracell) | 13.00 | 17.77 |
| $BaMnO_4$ (Carus Chemical) | 0.33 | 0.47 |
| $AgMnO_4$ (Alfa Aesar) | 3.17[1] | 5.07[1] |

[1]The silver permanganate hydrogen absorption was carried out at room temperature. Other embodiments are within the claims.

What is claimed is:

1. A primary alkaline battery comprising:
    a cathode comprising a hydrogen-absorbing cathode material;
    an anode comprising zinc free of lead, mercury or cadmium;
    a separator; and
    an alkaline electrolyte,
    wherein the hydrogen-absorbing cathode material absorbs at a rate faster than an equivalent amount of electrochemically-produced manganese dioxide within an equivalent time interval.

2. The battery of claim 1, wherein the zinc is free of lead, mercury and cadmium.

3. The battery of claim 1, wherein the zinc includes indium or bismuth.

4. The battery of claim 1, wherein the zinc includes 25 ppm–1000 ppm indium or 25 ppm–1000 ppm bismuth.

5. The battery of claim 1, wherein the zinc includes 25 ppm–1000 ppm indium and 25 ppm–1000 ppm bismuth.

6. The battery of claim 1, wherein the hydrogen-absorbing cathode material includes a nickel oxyhydroxide, a copper oxide, a barium permanganate, a chemically-produced manganese dioxide, a silver oxide, or a silver permanganate.

7. The battery of claim 1, wherein the hydrogen-absorbing cathode material includes a nickel oxyhydroxide.

8. The battery of claim 1, wherein the hydrogen-absorbing cathode material includes a silver oxide.

9. The battery of claim 1, wherein the hydrogen-absorbing cathode material includes a silver permanganate.

10. The battery of claim 1, wherein the hydrogen-absorbing cathode material includes a copper oxide.

11. The battery of claim 1, wherein the hydrogen-absorbing cathode material includes a barium permanganate.

12. The battery of claim 1, wherein the hydrogen-absorbing cathode material includes a chemically-produced manganese dioxide.

13. The battery of claim 1, wherein the hydrogen-absorbing cathode material absorbs at least 20% more hydrogen than an equivalent amount of electrochemically-produced manganese dioxide within an equivalent time interval.

14. A method of manufacturing a primary alkaline battery comprising:
    assembling a cathode comprising a hydrogen-absorbing cathode material, an anode comprising zinc free of lead, mercury or cadmium, a separator, and an alkaline electrolyte to form the alkaline battery, wherein the hydrogen-absorbing cathode material absorbs at a rate faster than an equivalent amount of electrochemically-produced manganese dioxide within an equivalent time interval.

15. The method of claim 12, wherein the zinc is free of lead, mercury and cadmium.

16. The method of claim 14, wherein the zinc includes indium or bismuth.

17. The method of claim 14, wherein the zinc includes 25 ppm–1000 ppm indium or 25 ppm–1000 ppm bismuth.

18. The method of claim 14, wherein the zinc includes 25 ppm–1000 ppm indium and 25 ppm–1000 ppm bismuth.

19. The method of claim 14, wherein the hydrogen-absorbing cathode material includes a nickel oxyhydroxide, a copper oxide, a barium permanganate, a chemically-produced manganese dioxide, a silver oxide, or a silver permanganate.

20. The method of claim 14, wherein the hydrogen-absorbing cathode material absorbs at least 20% more hydrogen than an equivalent amount of electrochemically-produced manganese dioxide within an equivalent time interval.

21. A primary alkaline battery comprising:

a cathode comprising an active material that absorbs hydrogen more rapidly than an equivalent amount of electrochemically-produced manganese dioxide within an equivalent time interval;

an anode comprising zinc free of lead, mercury, or cadmium; and an alkaline electrolyte.

22. The battery claim 21, wherein the active material includes a nickel oxyhydroxide, a copper oxide, a barium permanganate, a chemically-produced manganese dioxide, a silver oxide or a silver permanganate.

23. The battery of claim 21, wherein the zinc is free of lead, mercury, and cadmium.

24. The battery of claim 21, wherein the active material absorbs at least 20% more than an equivalent amount of electrochemically-produced manganese dioxide within an equivalent time interval.

* * * * *

UNITED STATES PATENT AND TRADEMARK OFFICE
CERTIFICATE OF CORRECTION

PATENT NO. : 6,489,056 B1
DATED : December 3, 2002
INVENTOR(S) : Stuart M. Davis and Enoch Wang It is certified that error appears in the above-identified patent and that said Letters Patent is hereby corrected as shown below:

<u>Title page,</u>
Item [56], FOREIGN PATENT DOCUMENTS, delete "0436653 A" and insert
-- 04366553 A --.

OTHER PUBLICATIONS, delete "Meghed" and replace with -- Megahed --; and delete "chime" and replace with -- chimie --.

Signed and Sealed this

Thirteenth Day of May, 2003

JAMES E. ROGAN
*Director of the United States Patent and Trademark Office*